INVENTOR
ALLEN A. GOEPPEL,

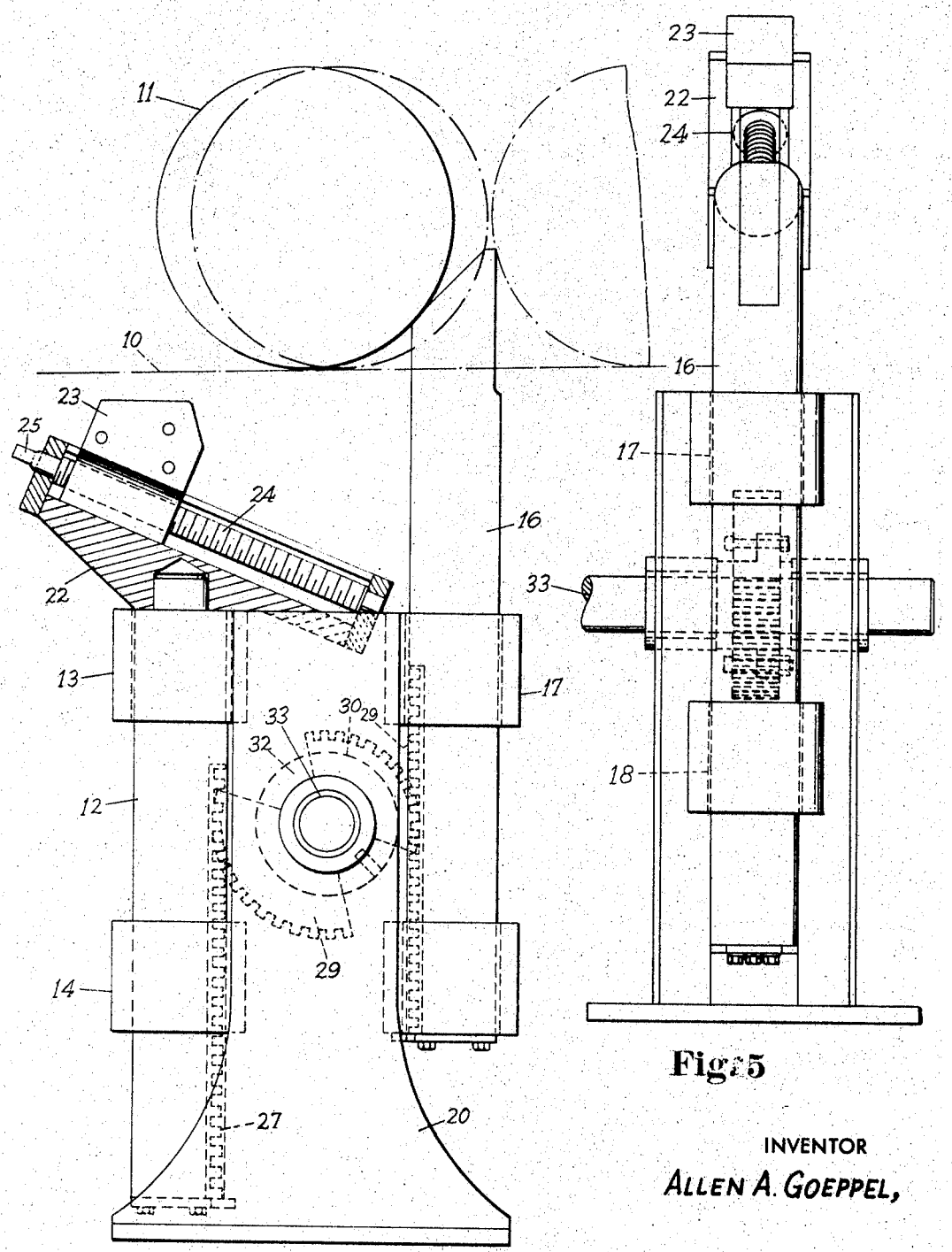

United States Patent Office 3,435,962
Patented Apr. 1, 1969

3,435,962
APPARATUS FOR HANDLING PIPE
AND THE LIKE
Allen A. Goeppel, Allison Park, Pa., assignor to Armco Steel Corporation, Middletown, Ohio, a corporation of Ohio
Filed Jan. 5, 1966, Ser. No. 518,839
Int. Cl. B66f 3/04
U.S. Cl. 214—1                                    7 Claims

ABSTRACT OF THE DISCLOSURE

A stop and kickout apparatus for handling pipe and the like comprising a table slanted to the horizontal and a pair of vertically reciprocable members one of which serves as a stop for the pipe and the other of which acts as a kickout when the stop is lowered and the kickout raised, whereby the pipe is sent rolling down the table. The stop is adjustable to accommodate pipe of different diameters and the stop moves faster than the kickout whereby to insure that the stop clears the pipe before the pipe is acted upon by the kickout. Preferably the adjustable stop moves along a line slanted to the axis of the pipe.

---

Figures 1, 2, 3:
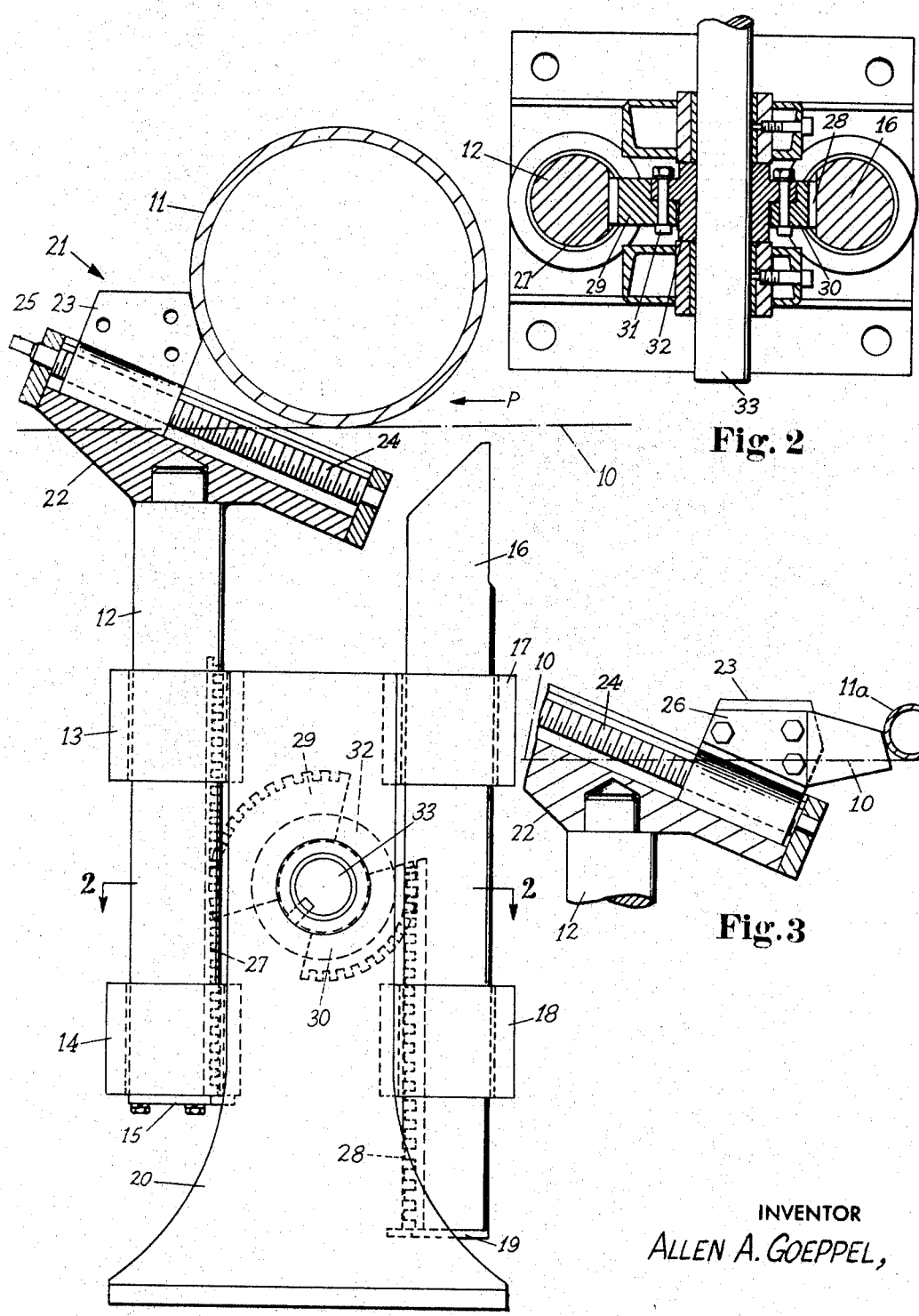

This invention relates to an apparatus for handling pipe and the like, and more particularly to an apparatus for automatically or semi-automatically controlling the flow of pipes or other elongated objects along handling tables and into testers or on to other processing stages.

In many industrial processes, it is necessary to advance elongated articles such as pipes, tubes, rods and the like in a direction perpendicular to their axes through a series of operational stations. For example, in the manufacture of pipe, a plurality of lengths of pipe are deposited on a charging table which preferably will be very slightly inclined tending to cause the pipe lengths to roll to the subsequent stations. Individual pipe lengths are then sequentially removed from the charging table and successively positioned at a plurality of stations which might include cutting or threading machines and one or more testing stations.

The most common form of control apparatus of the prior art includes a stop extending upwardly from the inclined table or rails. Pipe on the charging table roll by gravity into a position abutting this stop. The "kickout" of this arrangement comprises a vertically reciprocable member having an inclined face, and adapted to engage the endmost pipe (the pipe abutting the stop), and to lift this pipe over the stop permitting it to continue to the next operational station by rolling down the inclined rails.

The primary disadvantage of this arrangement of the prior art was the size and power required for the "kickouts." That is, in dealing with large diameter pipes (over 12′ O.D.) weights on the order of 1½ tons may be encountered.

Accordingly, it is a primary object of this invention to provide a system for controlling the flow of pipe or the like on handling tables which does not require that the rolling articles be lifted over a fixed stop.

Ancillary to this object, it is another object of the invention to provide an apparatus which is much simpler in construction, lighter in weight, and requires less power to operate than the devices of the prior art.

Another important object of this invention is to provide a stop and kickout mechanism which permits control of kickout speed and travel length.

Still a further object of the invention is to provide a stop and kickout arrangement which is readily adjustable for the handling of a wide variety of pipe sizes.

Numerous other objects and advantages of this invention will become apparent to the skilled worker in the art as this specification proceeds. Reference will be made from time to time to the accompanying drawings in which:

FIGURE 1 is a side elevational view with parts in section of the apparatus of this invention;
FIGURE 2 is a cross-sectional view along the line 2—2 of FIGURE 1;
FIGURE 3 is a fragmentary view showing some of the elements of FIGURE 1 in a different position of adjustment;
FIGURE 4 is a view similar to FIGURE 1 showing the elements in a different position of operation; and
FIGURE 5 is an end elevational view of the elements shown in FIGURE 1.

Briefly considered, this invention contemplates a stop and kickout apparatus including a vertically reciprocable stop rod and a vertically reciprocable kickout member. In the normal or initial position, the kickout member will be in a position below the surface of the handling table or inclined rails, while the stop rod projects upwardly therefrom. Therefore, when a plurality of lengths of pipe are arranged on the handling or charging table, they will roll down the inclined rails until they are stopped by the upwardly projecting stop member. As will be explained in more detail hereinafter, the stop rod includes an adjustable stop block which will insure the location of a wide variety of pipe sizes with respect to the kickout member.

When it is desired to move the pipe adjacent the stop block from this position to the next operational station, the following action takes place. The stop rod is lowered vertically to a position permitting the pipe to roll along the inclined rails. At the same time, the kickout member moves vertically upward at a position just between the last two pipes. The kickout member, as described in more detail hereinafter, will serve to kick out the last pipe, and to retain the others in position.

To complete the cycle of operation, the kickout member is lowered and the stop rod is raised, permitting the remainder of pipe lengths on the handling table to move forward against the stop rod, bringing the apparatus to the initial or starting condition once again.

Referring now to FIGURE 1, the dashed line 10 indicates the inclined surface of the rails or handling surface along which a plurality of lengths of pipe 11 are to be moved in a path of travel perpendicular to their axes.

The stop and kickout apparatus of this invention includes the stop rod 12 which is mounted for vertical reciprocation in the brackets 13 and 14. The upper limit of travel of the stop rod 12 is of course determined by the plate 15 suitably secured to the lowermost end.

Similarly, the kickout member 16 is vertically reciprocable in the brackets 17 and 18, and is provided with the plate 19 determining the upper limit to its travel.

The brackets 13, 14, 17 and 18 are all suitably secured to (in the specific embodiment shown, they are integrally formed with) the base 20.

Secured to the uppermost end of the stop rod 12 is the adjustable stop means indicated generally at 21. This includes the base 22, which is fixedly secured to the stop rod 12, and the stop block 23 which is slidable with respect to the base 22 in a plane which is inclined so as to be approximately parallel to a plane through the axes of various diameter pipes. Positioning of the stop block 23 with respect to the base 22 is accomplished by the externally threaded adjusting screw 24 which is journaled in the base 22 and threadably received in the stop block 23. The end 25 of the adjusting screw 24 projects outwardly from the base 22 so that it may be engaged by a wrench for easy adjustment.

As briefly indicated earlier in this specification, the vertically reciprocable kickout member 16 moves upwardly at a position intermediate the last two pipes or other objects resting on the surface 10. It will be apparent, therefore, that the stop block 23 must be adjusted for different diameter objects so that the trailing edge of the object is just over the kickout member 16. It will be observed by comparing FIGURES 1 and 3 that by virtue of the inclination of the sliding movement of the stop block 23 to the path of travel of the pipe, the top surface of the block 23 will be substantially just below the center line of the pipe 11 (FIGURE 1) or 11a (FIGURE 3) when the trailing edge of the pipe is located over the kickout member 16. As is seen in FIGURE 3, plates 26 may be secured to the block 23 for centering very small pipes.

The lower portion of the inner surface of the stop rod 12 and the kickout member 16 are provided respectively with the rack teeth 27 and 28. These teeth mesh respectively with the gear segments 29 and 30 which are in turn secured as by the bolt 31 to the common pinion 32. The common pinion 32 is in turn keyed or otherwise fixed to the shaft 33.

It will therefore be apparent that by virtue of the above arrangement, rotation of the shaft 33 will bring about vertical reciprocation of the two rack shafts, the stop rod 12 and kickout member 16, in opposite directions.

It will be recalled that one of the objects of this invention is to provide an apparatus which does not require the pipe or other elongated objects to be lifted over the stop member. In the preferred embodiment of the invention, it is therefore necessary that the stop rod 12 move downwardly from its initial position more rapidly than the kickout member 16 move upwardly. This will insure that the stop is below the surface of the table or rails 10 when the pipe 11 is "kicked" from its initial or stopped position. To this end, the pitch diameter of the gear segment 29 will be somewhat greater than that of the gear segment 30. A given angular movement of the shaft 33 will then impart a faster and longer stroke to the stop rod 12 than to the kickout member 16.

It is believed that operation of this invention will now be clear. By way of brief summary, in moving from the initial position with the stop rod extending upwardly beyond the surface of the table or rails, the longer and faster downward stroke of the stop rod as compared to the upward movement of the kickout member insures that the stop rod is out of the way before the pipe is kicked out. In the reverse situation, the stop rod will be returned to its initial positon very rapidly as the kickout member is lowered to its initial position. It will of course be understood that when the stop rod is below the surface of the table or rails 10, and the endmost pipe has been kicked out, the kickout member 16 in fact serves as a temporary stop to keep the remainder of pipe lengths on the table or rails 10 from rolling onward. Therefore, as the kickout member is lowered to its initial position, the stop rod will quickly be raised into its uppermost position to insure that no more than one pipe is kicked out at each time.

By virtue of the foregoing arrangement, it will be observed that the velocity of the kicked out pipe and the distances of travel on an inclined or horizontal table will be governed by the impact given to the endmost pipe by the kickout member upon its upward stroke. It will be apparent to the skilled worker in the art that the rate of stroke of the kickout member 16 can be controlled in a number of ways. For example, a suitable lever (not shown) can be secured to one end of the shaft 33, this lever in turn being actuated by a suitable fluid cylinder (not shown). With conventional flow control valving, one can govern the rate of piston movement of the fluid cylinder, and hence, ultimately, the impact delivered to the pipe lengths by the kickout member 16.

It is evident that any number of stop and kickout units can be placed in line, via connecting shafts, corresponding to the lengths of objects to be handled. In one embodiment handling pipes on the order of 10 to 50 feet in length, two to three stop and kickout mechanisms are actuated from a common shaft through a lever which is attached to an air cylinder. Of course, more cylinders and more or fewer stop and kickout stations may be employed; it would not be unusual to employ as many as five mechanisms, particularly when a variety of different pipe lengths is being handled.

While this invention has been described in terms of a specific exemplary embodiment, it will be understood that no limitations on this invention are intended, except insofar as specifically set forth in the claims which follow.

The embodiments of the invention in which an exclusive property or privilege is claimed are defined as follows:

1. A stop and kickout apparatus for controlling the movement of elongated objects in a path of travel perpendicular to their axes comprising:
   (a) a vertically reciprocable stop rod and an adjustable stop means carried by said stop rod; said adjustable stop means comprising a base secured to said stop rod and a stop block slidable with respect to said base in a plane inclined to said path of travel of said objects, and means for securing said stop block to said base in a desired relative position;
   (b) a vertically reciprocable kickout member; and
   (c) means for simultaneously moving said stop rod and said kickout member in opposite directions, said means being effective to move said stop rod more rapidly than said kickout member.

2. The apparatus claimed in claim 1 wherein said means for securing said stop block to said base comprises an externally threaded adjusting rod journaled in said base, said adjusting rod being threadably received in said stop block.

3. A stop and kickout apparatus for controlling the movement of elongated objects in a path of travel perpendicular to their axes comprising:
   (a) a vertically reciprocable stop rod;
   (b) a vertically reciprocable kickout member; and
   (c) means for simultaneously moving said stop rod and said kickout member in opposite directions, said means being effective to move said stop rod more rapidly than said kickout member,
said stop rod and said kickout member each comprising a vertically reciprocable rack shaft, and said means for simultaneously moving said stop rod and said kickout member in opposite directions comprising a single pinion including two gear segments with different pitch diameters meshing respectively with said stop rod and said kickout member, and means for turning said pinion.

4. The apparatus claimed in claim 3 wherein the larger pitch diameter gear segment meshes with said stop rod.

5. The apparatus claimed in claim 3 wherein said means for turning said pinion comprises a pinion shaft, a lever secured to said shaft, and fluid cylinder means operatively connected with said lever.

6. A stop and kickout apparatus for controlling the movement of elongated objects in a path of travel perpendicular to their axes comprising:
   (a) a vertically reciprocable stop member;
   (b) a vertically reciprocable kickout member;
   (c) means for simultaneously moving said stop member and said kickout member in opposite directions, said means for moving said members being effective to move said stop member more rapidly than said kickout member; and (d) an adjustable object engaging means carried by one of said members and arranged to engage a said object while a portion of said object is above the other of said members, said object engaging means being movable to and from object engaging position in a plane inclined to said path of travel of said objects.

7. The apparatus claimed in claim 6 in which said object engaging means is carried by said stop member.

References Cited

UNITED STATES PATENTS

| 2,210,531 | 8/1940 | Englebaugh et al. | 10—107 |
| 2,611,911 | 9/1952 | Graham et al. | 221—298 |
| 2,763,236 | 9/1956 | Cummings | 214—1 X |

GERALD M. FORLENZA, *Primary Examiner.*

FRANK E. WERNER, *Assistant Examiner.*